Patented June 24, 1930

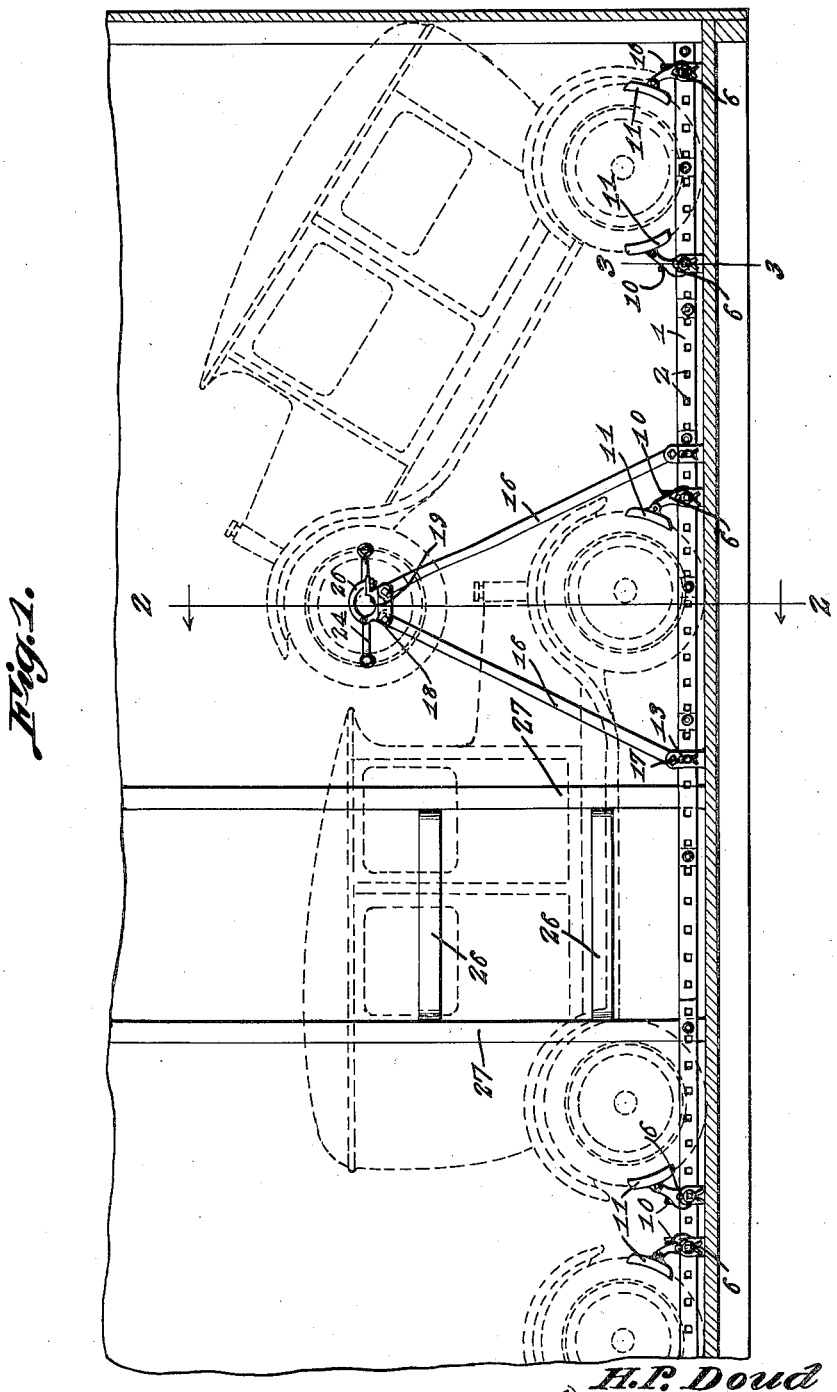

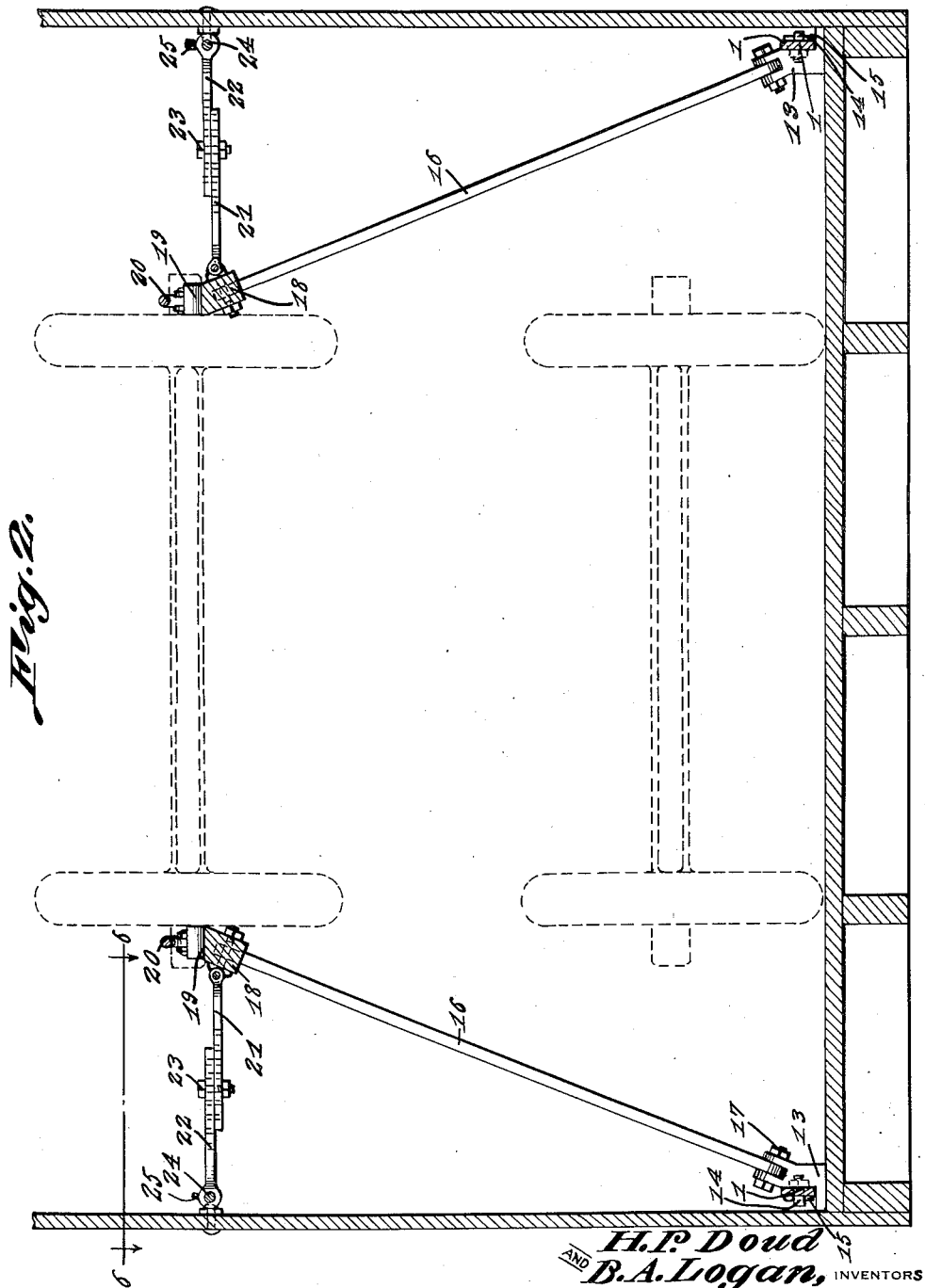

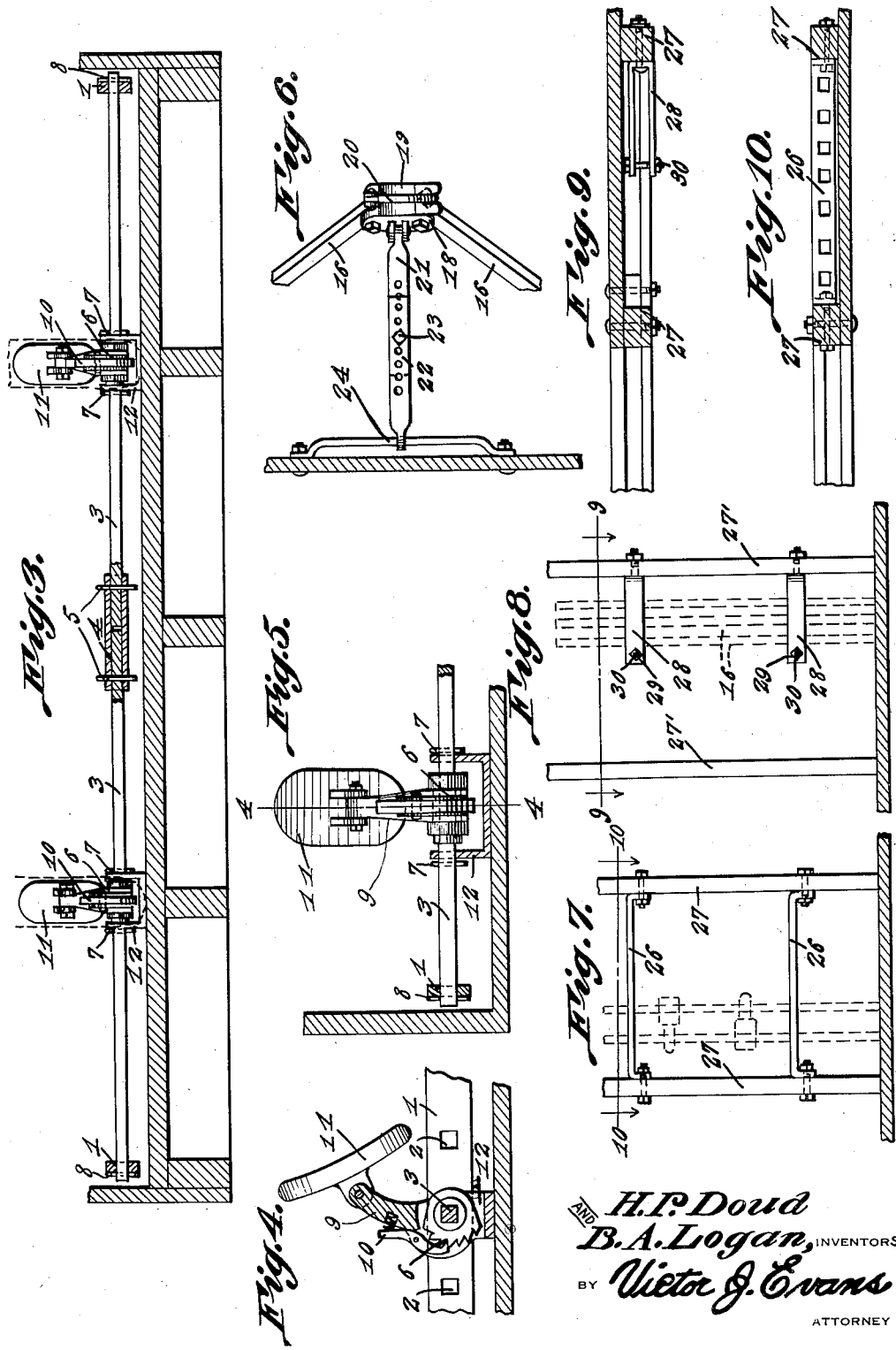

1,766,289

UNITED STATES PATENT OFFICE

HOBART P. DOUD AND BERT A. LOGAN, OF DECATUR, ILLINOIS

AUTOMOBILE TRANSPORTATION-SUPPORTING DEVICE

Application filed July 5, 1929. Serial No. 376,069.

This invention relates to automobile holding means for box cars, the general object of the invention being to provide means for holding automobiles in a car without the use of clamps, blocks, etc., which are nailed or otherwise fastened to the floor and which tend to damage the car.

Another object of the invention is to so form the holding means that they can be easily and quickly placed in position and which when not in use, can be placed in racks which will support them in such a manner that the car can be used for other purposes.

A further object of the invention is to make the parts adjustable so that they can be used on automobiles of different types and sizes.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a fragmentary longitudinal sectional view through a car, showing the invention in use.

Figure 2 is a section on line 2—2 of Figure 1.

Figure 3 is a section on line 3—3 of Figure 1.

Figure 4 is a section on line 4—4 of Figure 5.

Figure 5 is a view partly in section, looking toward the left side of Figure 4.

Figure 6 is a section on line 6—6 of Figure 2.

Figure 7 is a fragmentary elevation showing rack means for supporting portions of the invention.

Figure 8 is a view of another set of rack means.

Figure 9 is a section on line 9—9 of Figure 8.

Figure 10 is a section on line 10—10 of Figure 7.

In these views, the numeral 1 indicates a strip placed along each side of the car, adjacent the floor thereof, the strip being formed in sections which are bolted or otherwise fastened together and said strip being bolted or otherwise fastened to the side of a car. This strip is provided with a plurality of square holes 2.

The numeral 3 indicates a number of pairs of square rods, the rods of each pair having their inner ends adjustably and removably connected together by the sleeve 4 and the pins 5 which pass through the sleeve and rods and the outer ends of each pair of rods are adapted to be placed through the holes 2 in the strips 1. A number of ratchet wheels 6 is placed on each pair of rods 3, each wheel having an elongated hub having a square bore therein through which the rod passes and the hub is held against sliding movement on the rod by pins 7 which pass through holes in the rod and pins 8 are passed through holes in the outer ends of each pair of rods to hold the rods against movement in the strips 1, it being understood that the strips 1 are held spaced slightly from the sides of the car. The hubs are of circular shape and the two sections of an arm 9 have openings in their lower ends for receiving portions of the hub so that the sections of the arm are rotatably arranged on the hub and these sections straddle the ratchet wheel. The two sections are fastened together by pins or the like and if desired, the sections may be formed with wrench receiving portions so that they can be turned on the hub.

A spring pressed dog 10 is carried by each arm and engages the ratchet wheel for preventing turning movement of the arm in one direction on the hub. A shoe 11 is pivotally connected with each arm, these shoes being shaped to engage portion of a tire of a wheel of a motor vehicle. A U-shaped member 12 is placed on each rod 3 and straddles the hub of the ratchet wheel and is adapted to rest on the floor of the car and thus prevent the rod 3 from bending when the shoe is in engagement with a wheel.

The numeral 13 indicates a casting which is formed with a floor engaging part and with a square stud 14 which is adapted to pass through one of the holes 2 in the strip 1, a pin 15 being passed through the stud to attach the casting to the strip. A pair of these castings is attached to each strip 1 and the diverging bars 16 have their lower ends pivotally connected with each pair of castings, as shown at 17. The upper ends of each pair of bars are pivoted in a casting 18 which is formed with a semi-circular bearing 19 for receiving a portion of the hub of the vehicle, the said portion of the hub being held in the bearing by the substantially U-shaped member 20 which is pivoted at one end to the casting and has its other end detachably fastened to the casting by a slot and bolt connection. A rod 21 is pivoted to each casting 18 and is adjustably connected to a rod 22 by the bolt 23 which passes through any one of a number of pairs of holes in the rods 21 and 22. The rod 22 has an eye at its outer end which engages a bracket bar 24 which has its ends curved and fastened to a side of the car. A set screw 25 holds the bar 22 in adjusted position on the bar 24.

Bars 26 have their bent ends fastened to a pair of the posts 27 of the car, these bars 26 being superimposed and they are provided with perforations. The bars 3, with the shoe carrying parts thereon, are adapted to be placed in the racks formed by the bars 26, and the bars 16 and the parts attached thereto are adapted to be placed in the racks 28 between another pair of posts 27' of the car, the rack 28 being formed of a number of U-shaped members 29 bolted at one end to one of the posts and having a bolt 30 passing through its free ends, the bolts 30 holding the bars 16 between the limbs of the U-shaped member.

From the foregoing it will be seen that when an automobile or other vehicle is placed in the car, two pairs of the rods 3 are placed in position, with their outer ends engaging certain holes 2 in the strips 1 so that the shoes will engage the front and rear wheels, as shown in Figure 1. The arms of the shoes are adjusted to cause the shoes to engage the tires with the proper amount of pressure so as to prevent any movement of the vehicle. This is done by turning the arms on the hubs of the ratchet wheels and the dogs, engaging the teeth of the ratchet wheels, will hold the arms in adjusted position. It will be understood that a shoe engages each of the four wheels of the vehicle. When a car is to be raised, as shown at the right hand end of Figure 1, two pairs of the bars 16 are used to support the front axle of the car in raised positions, the hubs of the front wheels engaging the bearings in the castings 18 and the lower ends of the bars 16 being supported by the brackets or castings 13 which rest on the floor of the car and are fastened to the strips 1. By pivoting the upper ends of each pair of rods 16 to the bracket or casting 18, the bars can be moved toward or away from each other in raising and lowering the vehicle and after the vehicle has been raised to the desired position, the brackets 13 are fastened to the strip 1 by passing the lugs 14 through the proper holes 2 in the strips 1. The horizontal brace means, composed of the rods 21 and 22, are then placed in operative position to prevent side swinging of the vehicle, it being necessary to connect the rod 21 with the rod 22 by the bolt 23 to do this. By making these horizontal braces adjustable, they can be used with different sizes of motor vehicles. When the vehicle is to be held in raised position, the four shoes are placed in engagement with the two rear wheels of the vehicle, as shown at the right in Figure 1. When the vehicles have been unloaded, the rods 3 are separated from the strips 2 and from each other and placed in one of the racks and the bars 16, with the parts attached thereto, are placed in the other rack. It will, of course, be understood that as many sets of the wheel engaging members and the upright members will be used as there are automobiles placed in the car. The strips 1 remain in place at all times.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:—

1. Means for supporting vehicles in a car comprising a pair of strips fastened to the sides of the car at the floor thereof and having square holes therein, transverse rods having their ends passing through certain of said holes, wheel engaging members adjustably connected with said rods, a pair of inverted V-shaped members adjustably and detachably connected with the strips and means at the upper ends of said V-shaped members for receiving parts of the hubs of a vehicle.

2. Means for supporting vehicles in a car comprising a longitudinally extending strip fastened to each side of the car adjacent the floor thereof and having non-circular holes therein, a plurality of sectional rods having non-circular ends passing through certain of said holes, said rods extending transversely of the car, means for detachably connecting the sections together, arms rotatably connected with each rod, ratchet means for holding the arms in adjusted position and tire engaging shoes carried by the arms.

3. Means for supporting vehicles in a car comprising a pair of rods, means for adjustably and detachably connecting the ends of the rods with the sides of the car, a pair of ratchet wheels on each rod, means for holding the wheels against rotary movement, an arm rotatably mounted on each ratchet wheel, a dog carried by the arm engaging the ratchet wheel for holding the arm in adjusted position and a tire engaging shoe pivotally connected with each arm.

4. Means for supporting vehicles in a car comprising a pair of side strips at the sides of the car, a pair of brackets adjustably and removably connected with each strip and having portions engaging the floor of the car, a pair of uprights pivotally connected with each pair of brackets, a casting pivotally connected to each pair of uprights, said casting having a bearing therein for receiving a portion of a hub of the vehicle wheel and means for holding the hub in the bearing.

5. Means for supporting vehicles in a car comprising a sectional strip connected with each side of the car adjacent the floor thereof, means for adjustably connecting the sections together, said strip having non-circular holes therein, a plurality of sectional rods having non-circular ends fitting in the holes, pins for fastening the ends in the holes, a sleeve for detachably connecting together each pair of rod sections, a pair of arms on each rod, means for adjusting the arms on the rods, a tire engaging shoe pivotally connected with each arm, a pair of brackets associated with each strip and having non-circular projections passing through certain of the holes of the strip, pins for holding the projections in the holes, a pair of uprights pivotally connected with each pair of brackets, a casting pivotally connected with each pair of uprights and having a bearing therein for receiving a portion of a hub of a vehicle wheel and means for holding the hub in the bearing.

6. Means for supporting vehicles in a car comprising a sectional strip connected with each side of the car adjacent the floor thereof, means for adjustably connecting the sections together, said strip having non-circular holes therein, a plurality of sectional rods having non-circular ends fitting in the holes, pins for fastening the ends in the holes, means for detachably connecting together each pair of rod sections, a pair of arms on each rod, ratchet means for adjusting the arms on the rods, a tire engaging shoe pivotally connected with each arm, a pair of upwardly converging rods connected with each strip, a casting pivotally connected with the upper ends of each pair of rods and having a bearing therein for receiving portion of a hub of a vehicle wheel, and means for holding the hub in the bearing.

In testimony whereof we affix our signatures.

HOBART P. DOUD.
BERT A. LOGAN.